United States Patent Office 2,740,168
Patented Apr. 3, 1956

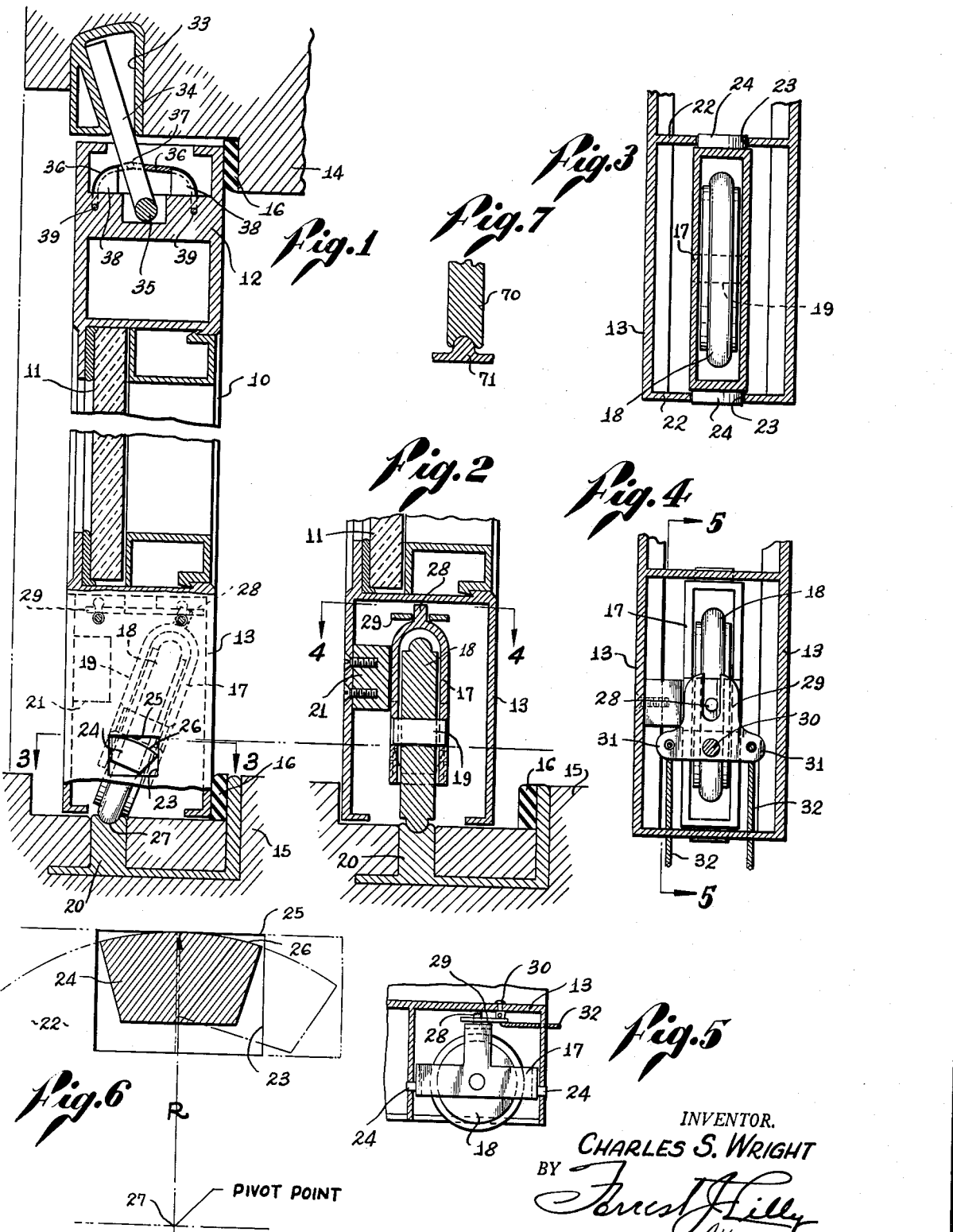

2,740,168
CLOSURE SEALING APPARATUS
Charles S. Wright, Van Nuys, Calif.
Application May 25, 1953, Serial No. 357,112
8 Claims. (Cl. 20—19)

This invention relates to closure members such as sliding panel type doors, windows, aircraft canopies, and the like and more particularly to a novel apparatus for effecting a sealing of the closure member against the opening. The invention has particular application to sliding glass doors and windows in which it is desired to make them air tight when in the closed position and also prevent their rattling. The principles of the invention are also useful however for effecting hermetically tight seals for canopies such as used to enclose pressurized cockpits in aircraft.

In sliding type closure members there are usually provided roller elements in the form of casters, for example, for facilitating this sliding movement. Since it is desired that these closure members slide with as little friction as possible, there is generally a small space between the frame of the opening to be closed and the periphery of the door itself, the only contact between the door proper and the frame opening being that of the roller means and a suitable track therefor. As a consequence, there are numerous cracks through which cold air may seep. Furthermore such construction subjects the closure member to the possibility of rattling in its closed position in the presence of high wind. This is especially noticeable in large sliding glass plate doors used in buildings.

There have been proposed in the past certain types of caster rollers which are adapted to angulate when the door is in closed position to drop the door down against a suitable weather seal whereby the aforementioned difficulties are to some extent overcome. In every such prior proposed system however, the closure member will be moved laterally in its own plane as well as in a direction normal to its plane. For example, in the case of the sliding glass door, the tilting of the roller elements will cause the door to drop a slight amount leaving an undesired gap along its upper edge. In the case of aircraft canopies and certain other types of closure members for special applications, it is not only desirable but imperative that the closure member not shift laterally in its own plane but move only in a direction normal to its plane to effect its sealing or locking position with respect to the opening.

A system permitting only this type of motion is advantageous in that the frame of the opening need be no larger than the dimension of the closure member since the frame need not accommodate any dropping or elevating, that is, lateral, movement of the member. Furthermore, with the elimination of any lateral movement on the part of the closure member there results an absolutely uniform sealing of the member on a suitable peripheral gasket and the sealing force is at all times directly normal to such gasket.

On the other hand, there are instances where some lateral movement of the closure member may be desired. For example, this characteristic, as employed in the present invention will permit a self-positioning or righting property to be given to vertical closure members, which property may outweigh the above noted disadvantages for certain applications.

The present invention has as its primary object the provision of roller elements for sliding type closure members in which the member may be moved in a direction normal to its plane by suitable tilting of the roller elements without any lateral shift, if none is desired, of the closure member in its own plane.

Another object is to provide in such a roller element apparatus, a means for controlling the amount of any lateral movement of the closure member, where such lateral movement may actually be desired. Realization of this last object additionally results in the self-righting feature referred to, or a self-sealing feature, dependent upon the particular design of the roller element apparatus.

These and further objects of the present invention are attained by providing a roller element rotatably mounted in a frame member in turn pivoted by a unique mounting or pivoting means to a housing. The housing may comprise an integral part of, or be secured to an edge or edges of the closure member. The pivoting means of the frame to the housing is such that the roller may be tilted out of the plane of the closure member to move the closure member in a direction normal to its plane without any lateral movement of the closure member.

This unique mounting is accomplished by maintaining the distance between the point of contact between the roller element on its corresponding track, and the bearing point of the closure member on the roller element frame, substantially equal and the line connecting the points in the same direction throughout the entire motion of the closure member in the direction normal to its plane. Maintaining these bearing contact points equidistant and in the same direction is in turn realized by providing a convex bearing surface on the frame adapted to roll on a corresponding flat bearing surface on the housing, the radius of curvature of the convex bearing surface being equal to said distance.

As a consequence of this construction, by varying the radius of curvature of this convex bearing surface, some lateral movement may purposely be imparted to the door to move it in its own plane as well as in the desired direction normal to its plane. In the case of a vertically disposed door for example, this feature inherently results in a self-righting characteristic if the radius of curvature of the convex bearing surface is made larger than the referred to distance, or in the event the radius of curvature is made smaller than said distance, the door will have a tendency to assume its sealed-closed position.

A better understanding of the invention will be had by referring to the accompanying drawings in which:

Fig. 1 is an enlarged cross-sectional view of a sliding glass door panel incorporating the invention;

Fig. 2 is an enlarged cross-sectional view of the lower portion of the door in its position for sliding lateral motion for opening and closing;

Fig. 3 is a plan view partly in section of the roller element frame and housing;

Fig. 4 is another plan view as seen along the line 4—4 of Fig. 2;

Fig. 5 is a side view partly in section of the roller element frame housing as seen along the line 5—5 of Fig. 4;

Fig. 6 is a schematic diagram useful in explaining the principles of the invention; and Fig. 7 shows a modified type of roller element and track.

Referring to Fig. 1, an illustrative use of the invention on a sliding type glass panel door is shown incorporating roller elements along its bottom edge. The closure member or door comprises a door frame 10 supporting a plate glass slab 11 between an upper housing frame 12 and a lower housing 13. The direction of movement of the door for closing the opening defined by the upper and lower walls 14 and 15 is in a direction normal to the paper; that is, the opening and closing movements of the door take place in a lateral direction into and out of the plane of the drawing. About the opening, there is preferably provided a peripheral rubber weather stripping 16 or gasket against which the door 10 is adapted to be urged after it has been moved to its closed position. To seal the door against the stripping 16 to render the opening draft proof and prevent rattling, the door is moved in a direction normal to its plane by a suitable tilting of the roller elements.

Referring to Fig. 2, there is provided in the lower housing 13 a frame member 17 rotatably supporting such roller elements 18, as at 19. The roller element is adapted to roll in a suitably shaped track 20. There may also be provided within the lower housing 13 a block 21 serving as a stop to limit tilting motion of the roller 18 in one direction.

The frame 17 is tiltably mounted within the housing 13 by a novel pivoted means. This mounting, as shown in Fig. 3, incorporates the end walls 22 of the housing 13 in each of which there is provided an opening 23 adapted to receive extending shafts or trunnions 24 from the frame 17.

Referring again to Fig. 1, it will be noted that the shaft 24 has a cross-section in the shape of a truncated sector, while the opening 23 is substantially rectangular, the top portion 25 of the opening comprising a flat bearing surface adapted to rest on the convex bearing surface 26 of the upper side of the shaft 24. The radius of curvature of the convex surface 26 designated R in Fig. 6 is made to equal the distance between the point of contact at opening 23 on the convex surface and the point of contact 27 of the roller element 18 and track 20. Therefore when the closure member is moved from its normal rolling position, as shown in Fig. 2, against the weather stripping 16 in its closed sealing position, as shown in Fig. 1, the weight of the door is borne by the bearing surface 26 on the shaft 24, the top flat bearing surface 25 of the opening 23 rolling along this convex surface. There is no drop or vertical movement in the door between these two positions because the vertical distance between the bearing contact point of the surfaces 25 and 26 and the contact point of the roller element 18 on the track 20 remains the same throughout the motion of the door.

It is to be noted that the axis of the shaft 24 is disposed lower than the axis 19 of the roller element, the axes being in parallel planes. This lower disposition permits the arcuate extent of the convex surface 26 to be of a limited value for a given door movement due to its closer proximity to the track 20. Also the cross-sectional area of the shaft 24 may be made smaller.

In order to positively effect the tilting of the frame 17 within the housing 13 thereby causing the door to execute this last mentioned motion, there is provided as shown in Figs. 4 and 5, a pin 28 secured to the top of the frame 17. This pin is adapted to be cammed in a lateral direction by the inner walls of a slot defined by a bifurcated element 29, pivoted as at 30, to the top of the housing. The element 29 includes two laterally spaced ears 31 to which are secured respectively a pair of cables 32. The cables 32 may run around the edge periphery of the door to a suitable lever or handle mechanism to actuate either one or the other. It will be evident at once that pulling either one of the cables 32 will cause the bifurcated element 29 to rotate about the pivot point 30 to cam the pin 28 in one direction or the other thereby tilting the frame and roller element.

Referring again to Fig. 1, there is shown along the upper edge of the opening a guiding channel 33 cooperating with a slide 34 mounted in the upper housing frame 12 and pivoted at 35. At a point spaced from the pivot 35 and secured to the slide 34, two cables 36 are attached as at 37, and passed over guiding arcuate surfaces 38 through suitable openings 39 to travel around the periphery of the door. These cables may be coupled to the cables 32 so that the tilting motion imparted to the frame 17 and roller element 18 is simultaneously imparted to the slide member 34 thereby camming over the upper edge of the door 10.

The reason for using the slide arrangement along the upper edge in the case of large-sized glass panel doors is because the doors have a tendency to sag under their own weight and any such sag will be accommodated by the fact that channel 33 has a given depth accommodating the in and out motions of the slide 34. In other applications it is of course contemplated that roller elements and suitable frame housings, such as on the lower edge of the door 10, may also be incorporated around the complete periphery of the closure member replacing the slide and channel system on the upper part of the door.

Fig. 7 shows a roller element 70 and complementary track arrangement 71 which may be employed in place of the roller element 18 and track 20, shown in the other figures.

In the operation of the sliding type closure member, the normal position of the roller elements is as shown in Fig. 2 in which position the door is free to roll laterally in its own plane with substantially negligible friction. When the door is rolled to its closing position, actuation of the cable 32 will cause the tilting of the frame member 17, whereby the whole door will be moved in a direction normal to the plane of the closure against the weather stripping 16, the weight of the door bearing on the convex surface 26 of the shaft 24. As stated above, because the radius of curvature of the convex surface 26 is constant, there will be absolutely no upward or downward movement in the door. Simultaneously with this action the slide 34 will move the upper end of the door 10 against the weather strip due to its camming action against one side of the channel 33.

It is to be noted that should a slight drop or elevation in the door be desired, it is possible to effect this result by simply modifying the convex surface 26 of the shaft 24 to change the radius of curvature. For example, if the radius of curvature R is increased, the movement of the door against the weather seal 16 will result in a slight elevation of the door, whereas if the radius of the curvature R is decreased, movement of the door towards the weather stripping 16 will result in a slight drop. Since the center of gravity of the whole mass of the door will have a natural tendency to assume the lowest possible position, making the radius of curvature R smaller than that shown in Fig. 6 will result in a tendency for the door to rest against the seal 16, a positive action on the cables 32 being required to bring the door to its rolling position as shown in Fig. 2. On the other hand, if the radius of curvature R is increased over the value shown in Fig. 6, the center of gravity of the door will have its lowest position when in the rolling position shown in Fig. 2. Under these circumstances the door will have a self-righting tendency; that is, the frame member 17 will tend to right itself to a vertical position and the position of stable equilibrium for the door will be realized in the position shown in Fig. 2. The preferred arrangement however, is to have the radius of curvature of the convex surface 26 of the exact value necessary so that neither a drop, nor a vertical elevation, is imparted to the door but rather only motion in the normal direction for the sealing operation is had.

Various modifications within the spirit of the present invention will occur to those skilled in the art. For example, while only one type of means for tilting the frame member 17 has been disclosed, specifically the cable and bifurcated element 29 adapted to cam pin 28 in given directions, other means equally as suitable may be employed. For example, the cable 32 could be secured directly to the pin 28 and pass over suitable arched bearing surfaces as suggested by the system employed for moving the slide 34 in the upper housing shown in Fig. 1. Also, a slight extension could be appended to the shaft 24 and a suitable transverse member secured thereto the ends of which are in turn adapted to be moved by the cables 32.

I claim:

1. In an apparatus for sealing a closure member in an opening, the opening having a guide track for a closure mounted roller positioned along an edge thereof, the combination comprising: a roller adapted to roll on and be guided by said track and to rock thereon; a rocker frame rotatably mounting said roller; means pivotally mounting said rocker frame to an edge of said closure member comprising pivot shafts extending from opposite ends of the rocker frame in a direction substantially normal to the plane of the roller axis; a housing for said frame rigidly secured to an edge of the closure member; and openings in opposite end walls in said housing adapted to receive said shaft, the top inner portion of said openings being flat and adapted to bear against the tops of said shafts, the tops of said shafts, as viewed in a cross-section, having convex bearing surfaces of radius of curvature substantially equal to the distance between the point of contact of said shaft bearing surfaces with the openings and the point of contact of the roller with the track, whereby tilting of said rocker frame will permit the closure member to move only normally to its plane, there being no lateral displacement of the closure member; and means for tilting said rocker frame.

2. An apparatus according to claim 1, in which said frame pivot shafts are displaced from the plane of the roller axis and lie in a plane parallel to the plane of the roller axis.

3. In an apparatus for closing and opening a closure member; a frame member; a roller element rotatably mounted in the frame member and adapted to ride in a track parallel to the plane of and adjacent to said opening; a housing for said frame member rigidly secured to an edge of the closure member; means mounting said frame member in the housing whereby the axis of said roller element is substantially normal to the plane of the closure member; said mounting means comprising a portion of the frame member having a convex bearing surface of radius of curvature substantially equal to the distance between said surface and the furthest peripheral point of said roller elements; a flat cooperating bearing surface on said housing in engagement with said convex surface, whereby said frame member convex surface may roll on said flat bearing surface upon tilting of said roller element with respect to the plane of the closure member, to move the closure member only in a direction normal to its plane.

4. In an apparatus for transversely shifting a closure in the opening of a closure frame having a guide track for a closure mounted roller along an edge thereof, the combination of: a roller adapted to roll on and be guided by said track and to rock thereon, a rocker frame rotatably mounting said roller, trunnions on said rocker frame extending at right angles to the plane of the roller, a fixture mounted on an edge of the closure corresponding to said track having spaced walls formed with apertures rockably receiving said trunnions, whereby the frame and roller assembly is rockable on said track relative to the plane of the closure, the edge portions of said apertures remote from said track comprising bearing surfaces and the opposed surfaces of said trunnions comprising bearing surfaces having rolling engagement against said aperture bearing surfaces, said engaging aperture and trunnion bearing surfaces being profiled relative to one another in such manner as to support said closure against substantial lateral shifting toward said track during rocking motion of said rocker frame and roller.

5. The subject matter of claim 4, wherein said aperture bearing surface is substantially perpendicular to the plane of said closure, and the trunnion bearing surface is formed on an arc whose center is located in the region of the point of contact of the roller on the track.

6. The subject matter of claim 4, wherein said aperture bearing surface is substantially perpendicular to the plane of said closure, and the trunnion bearing surface is formed on an arc whose center is located below the point of contact of the roller on the track.

7. The subject matter of claim 4, wherein said aperture bearing surface is substantially perpendicular to the plane of said closure, and the trunnion bearing surface is formed on an arc whose center is located between the trunnions and the point of contact of the roller on the track.

8. The subject matter of claim 4, wherein the track and the closure mounted roller are at the bottom of the closure frame opening and closure, respectively, and wherein said aperture and trunnion bearing surfaces are formed to elevate said closure slightly as the rocker and roller swing out of a vertical plane, whereby the rocker and roller are gravity biased to return to said vertical plane when displaced therefrom.

References Cited in the file of this patent

UNITED STATES PATENTS

| | | |
|---|---|---|
| 1,813,553 | Van Dorn | July 7, 1931 |
| 2,199,182 | Leonard | Apr. 30, 1940 |
| 2,570,563 | Kreimendahl | Oct. 9, 1951 |